(12) United States Patent
Mak et al.

(10) Patent No.: US 11,176,436 B2
(45) Date of Patent: Nov. 16, 2021

(54) RADIO FREQUENCY COMMUNICATION DEVICE AND A METHOD FOR USING THEREOF

(71) Applicant: Hong Kong R&D Centre for Logistics and Supply Chain Management Enabling Technologies Limited, Pok Fu Lam (HK)

(72) Inventors: Chi Lun Mak, Pok Fu Lam (HK); Jing Tian Xi, Pok Fu Lam (HK); Kwong Yeung Simon Wong, Pok Fu Lam (HK)

(73) Assignee: Hong Kong R&D Centre for Logistics and Supply Chain Management Enabling Technologies Limited, Pok Fu Lam (HK)

( * ) Notice: Subject to any disclaimer, the term of this patent is extended or adjusted under 35 U.S.C. 154(b) by 196 days.

(21) Appl. No.: 16/493,578

(22) PCT Filed: Mar. 15, 2017

(86) PCT No.: PCT/CN2017/076796
§ 371 (c)(1),
(2) Date: Sep. 12, 2019

(87) PCT Pub. No.: WO2018/165914
PCT Pub. Date: Sep. 20, 2018

(65) Prior Publication Data
US 2021/0142142 A1 May 13, 2021

(51) Int. Cl.
*G06K 19/077* (2006.01)
(52) U.S. Cl.
CPC .............................. *G06K 19/07773* (2013.01)
(58) Field of Classification Search
CPC ...................... G06K 19/07773; G06K 19/077
See application file for complete search history.

(56) References Cited

U.S. PATENT DOCUMENTS

| 6,043,746 | A | 3/2000 | Sorrels | |
|---|---|---|---|---|
| 2013/0306741 | A1 | 11/2013 | Hino et al. | |
| 2013/0315511 | A1* | 11/2013 | Chen | G06K 19/07771 383/116 |
| 2020/0372318 | A1* | 11/2020 | Bryant | B65D 55/06 |

FOREIGN PATENT DOCUMENTS

| CN | 103514477 | 1/2014 |
|---|---|---|
| WO | 2005062247 | 7/2005 |

* cited by examiner

*Primary Examiner* — Sonji N Johnson
(74) *Attorney, Agent, or Firm* — Renner, Kenner, Greive, Bobak, Taylor & Weber

(57) ABSTRACT

A radio frequency communication device comprising: a conductive loop being electrically connected to an integrated circuit arrangement; and a pair of opposing conductors extending away from the conductive loop and the integrated circuit arrangement; wherein at least a portion of the pair of opposing conductors or the conductive loop is frangible.

17 Claims, 9 Drawing Sheets

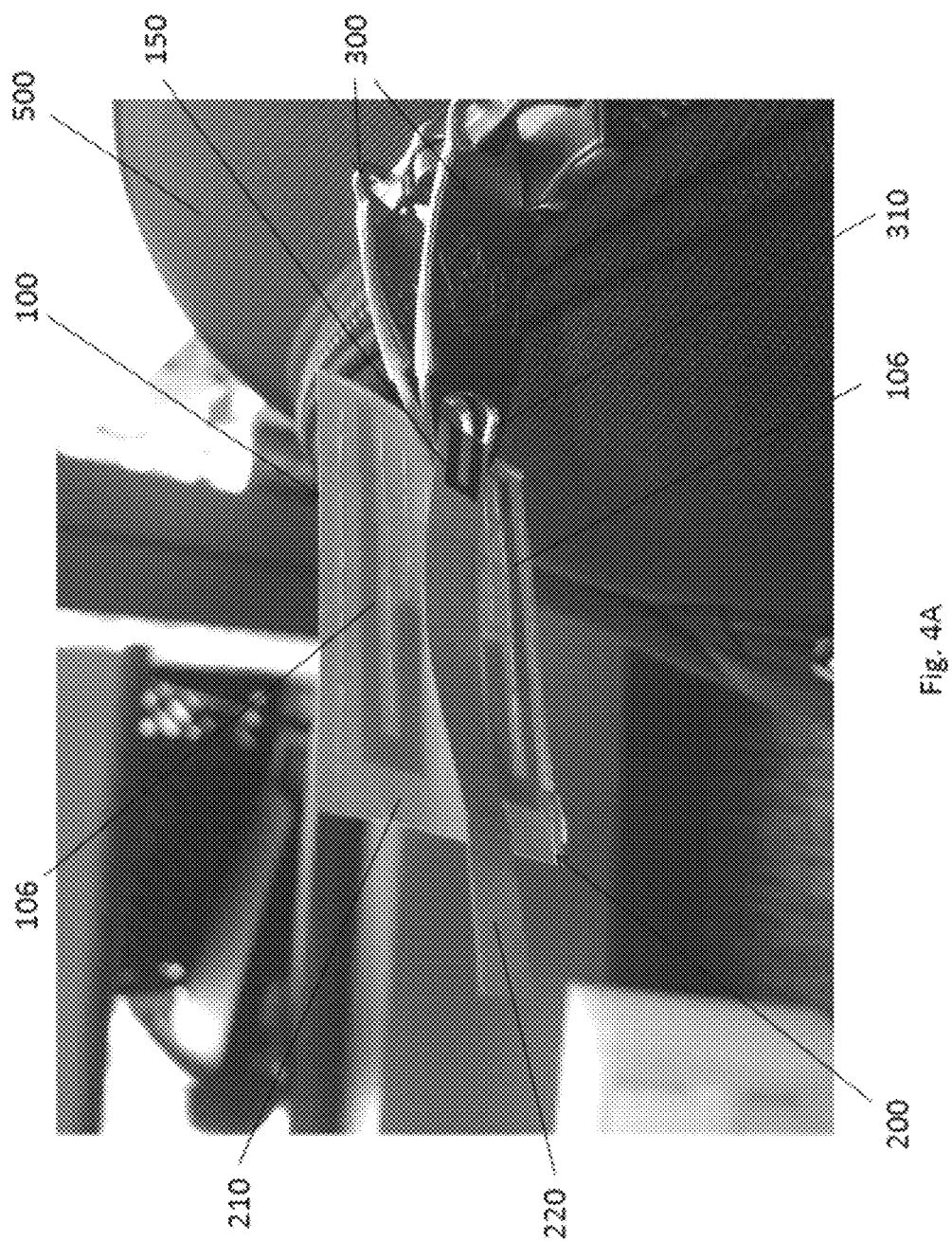

RADIO FREQUENCY COMMUNICATION DEVICE AND A METHOD FOR USING THEREOF

TECHNICAL FIELD

The present invention relates generally to a radio frequency communication device and a method for using thereof and more particularly, although not exclusively, relates to a radio frequency communication device having a conductive loop being electrically connected to an integrated circuit arrangement and a pair of opposing conductors extending away from the conductive loop and the integrated circuit arrangement, wherein the pair of opposing conductors or the conductive loop is frangible.

BACKGROUND

The major options for traveling to a major metro airport with lots of luggage are tedious and unimpressive. Travellers may go by driving or other public transports, which comes with the stress of beating traffic against a ticking clock, and as a result, one may fail to arrive the airport on time should he faces severe traffic congestion. Alternatively, one may travel by transit or train, which comes with the uncomfortable and often physically demanding task of manoeuvring baggage through turnstiles, up and down stairs, and in between crowds of fellow riders.

Although travellers may consider the alternative option, for example, one may check-in and deposit their baggage at a metro station through in-town check, and proceed to the airport directly baggage-free, spend the rest of the day in the city, or do whatever they like to do, such option still subjects to certain limitations. For instance, the metro stations with in-town check-in spot may be too remote for the travellers. The travellers may enjoy the in-town check-in service only a few hours, or at most, one day before their flight take off. In all, the travellers still have to proceed to the airport with a few hours in advance during rush hours. Thus, the current check-in system still lacks flexibility to a certain extent.

SUMMARY OF THE INVENTION

To solve or reduce at least some of the above problems, the present invention discloses a radio frequency communication device comprises a conductive loop being electrically connected to an integrated circuit arrangement; and a pair of opposing conductors extending away from the conductive loop and the integrated circuit arrangement; wherein at least a portion of the pair of opposing conductors or the conductive loop is frangible.

In accordance with a first aspect of the present invention, there is provided a radio frequency communication device comprising: a conductive loop being electrically connected to an integrated circuit arrangement; and a pair of opposing conductors extending away from the conductive loop and the integrated circuit arrangement; wherein at least a portion of the pair of opposing conductors or the conductive loop is frangible.

In one embodiment of the first aspect, the connection between the conductive loop and the integrated circuit arrangement is frangible.

In one embodiment of the first aspect, the conductive loop is electrically connected to the integrated circuit arrangement through a first frangible path.

In one embodiment of the first aspect, the pair of opposing conductors is extended away from the conductive loop and the integrated circuit arrangement through a second frangible path.

In one embodiment of the first aspect, the first frangible path is adjacent to the second frangible path.

In one embodiment of the first aspect, a first portion of at least one of the first frangible path and the second frangible path is folded over its opposing second portion such that the first portion overlaps with the second portion.

In one embodiment of the first aspect, the radio frequency communication device is readable by a reader at an operating read range at order of cm to 10-of-cm.

In one embodiment of the first aspect, the read range of the radio frequency communication device drops significantly when at least one of the first frangible path and the second frangible path is damaged.

In one embodiment of the first aspect, the radio frequency communication device is no longer readable by the reader at the operating read range or even at a more proximate read range than the operating read range when at least one of the first frangible path and the second frangible path is damaged.

In one embodiment of the first aspect, the first portion of the frangible paths overlaps with the second portion of the frangible paths to form a frangible loop.

In one embodiment of the first aspect, the conductive loop and the pair of opposing conductors are disposed onto a substrate to form a tag.

In one embodiment of the first aspect, one end of the substrate is strongly adhered to the main tag body to secure the frangible loop.

In one embodiment of the first aspect, the substrate is formed by a fragile material.

In one embodiment of the first aspect, the substrate is provided at least a perforated line or a perforated structure such that the frangible loop is further damage-prone.

In one embodiment of the first aspect, the frangible loop is attached to a baggage fastening means through a ring structure.

In one embodiment of the first aspect, the ring structure is an integral part of the baggage fastening means.

In one embodiment of the first aspect, the ring structure is formed by rigid material such as metallic material or plastic.

In one embodiment of the first aspect, the baggage fastening means includes zipper or tensioned wire such as metallic wire, adhesive tape, or tamper evident tape.

In one embodiment of the first aspect, the ring structure includes zipper pull.

In one embodiment of the first aspect, the radio frequency communication device is no longer readable by the reader at the operating read range or even at a more proximate read range than the operating read range if the baggage has been tampered.

In accordance with a second aspect of the present invention, there is provided a method for using a radio frequency communication device in accordance with any one of the preceding claims, comprising the steps of: fastening a baggage with the baggage fastening means; putting the first portion of the frangible paths through the ring structure of the baggage fastening means such that the first portion overlaps with the second portion of the frangible paths to form a frangible loop.

In one embodiment of the second aspect, further comprising the step of adhering the first portion of the frangible paths to the second portion of the frangible paths to secure the frangible loop.

BRIEF DESCRIPTION OF THE DRAWINGS

Embodiments of the present invention will now be described, by way of example, with reference to the accompanying drawings in which:

FIG. 4A shows a top view of the tag attached to an airport baggage handling label in accordance with one embodiment of the present invention;

DETAILED DESCRIPTION OF THE PREFERRED EMBODIMENT

Figure 1A:
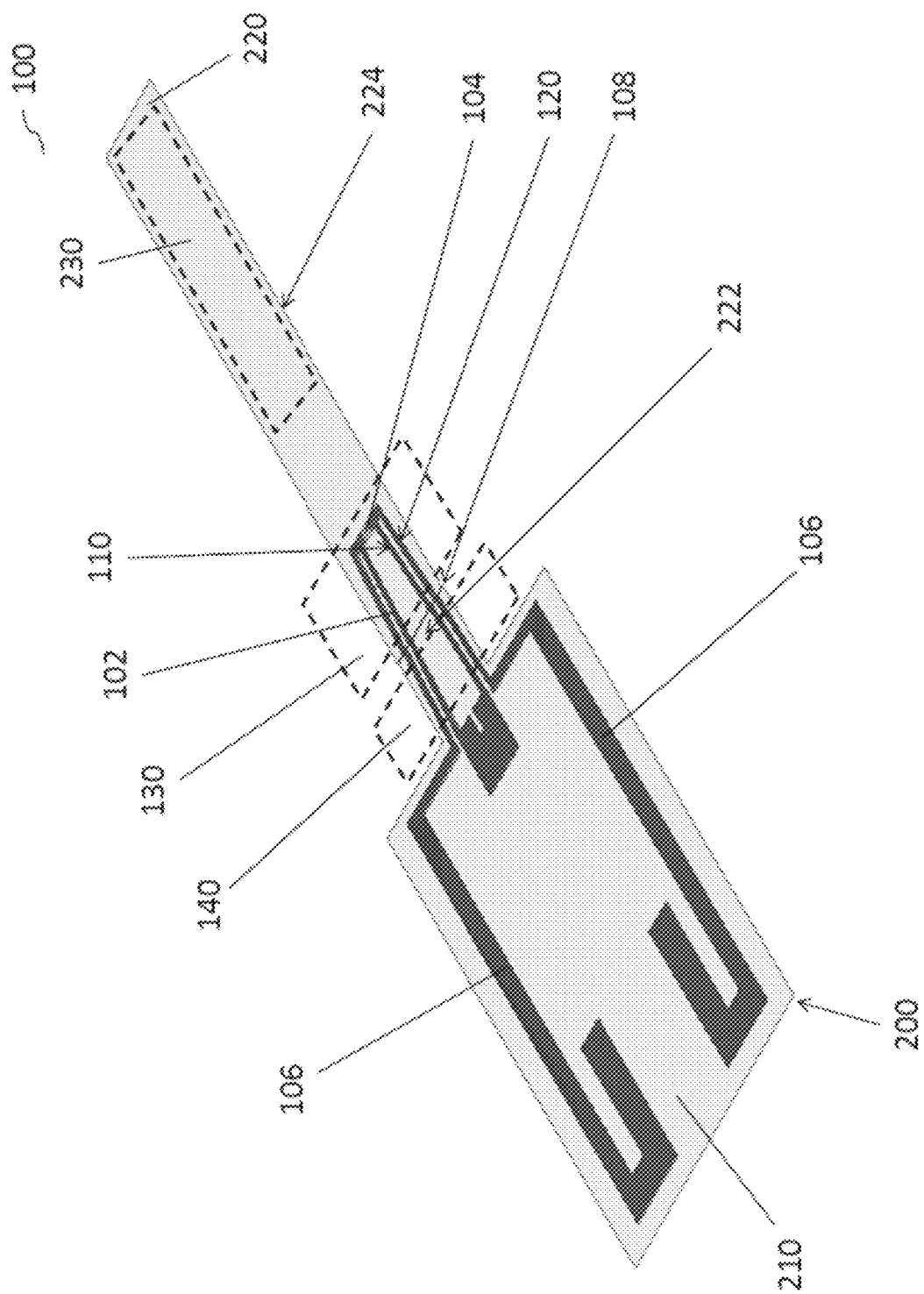
FIG. 1A shows a schematic view of the tag in accordance with one embodiment of the present invention.

With reference to FIG. 1, there is provided a radio frequency communication device 100 comprising: a conductive loop 102 being electrically connected to an integrated circuit arrangement 104; and a pair of opposing conductors 106 extending away from the conductive loop 102 and the integrated circuit arrangement 104; wherein at least a portion of the pair of opposing conductors 106 is frangible.

In this embodiment, the radio frequency communication device 100 is provided with a loop 102 and a pair of thin conductive wires 106. The pair of thin conductive wires 106 forms a pair of opposing elongated conductors 106, i.e. a radiator or an antenna. The pair of opposing elongated conductors 106 is being disposed adjacent to the conductive loop 102, such that these elongated conductors 106 are conductively separated or capacitatively separated from the conductive loop 102.

Figure 1B:
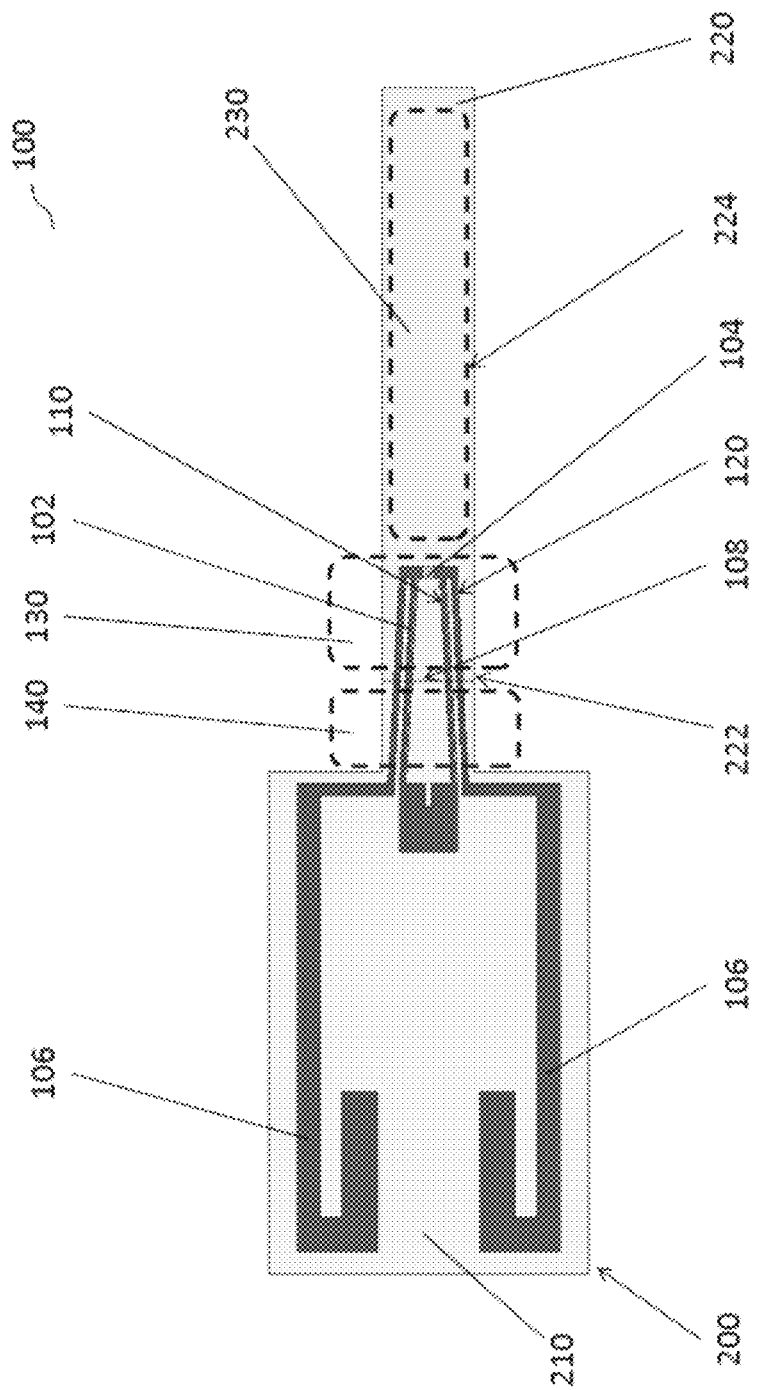
FIG. 1B is a top view of FIG. 1A in accordance with one embodiment of the present invention.

With reference to FIGS. 1A to 1B, the conductive loop 102 is electrically connected to the integrated circuit arrangement 104 through a first path 110. The pair of thin conductive wires 106 may be extended away from the integrated circuit arrangement 104 and further away from the conductive loop 102 through a second path 120, thereby forming a pair of opposing conductors 106. The first path 110 is adjacent to the second path 120, and in one example, the first and second paths 110 and 120 may be substantially in parallel arrangement.

In one embodiment, the pair of opposing conductors 106 may be extended away from the conductive loop 102 and the integrated circuit arrangement 104 through a first frangible path 110. Preferably, the pair of opposing conductors 106 is extended away from the conductive loop 102 and the integrated circuit arrangement 104 through a second frangible path 120, thereby forming a frangible connection therebetween. The radio frequency communication device 100, especially the first frangible path 110 and the second frangible path 120, is very frangible and damage-prone.

Preferably, a folding line 108 may be provided across the first and second frangible paths 110 and 120, or alternatively normal to the first and second frangible paths 110 and 120, to define a first portion 130 and an opposing second portion 140, of which each receives at least part of the first frangible path 110 and the second frangible path 120.

Figure 1C:
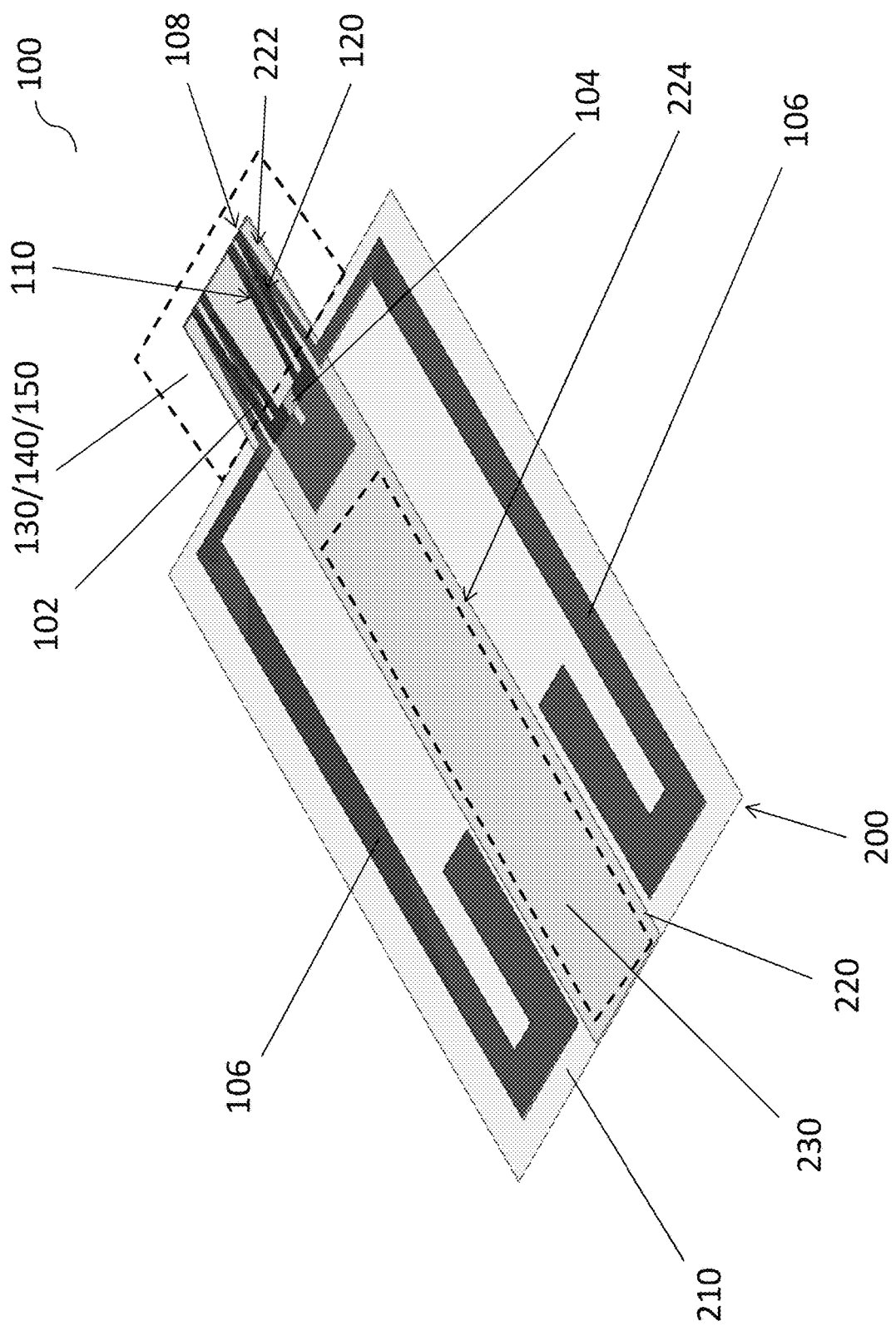
FIG. 1C shows a schematic view of the folded tag in accordance with one embodiment of the present invention
Figure 1D:
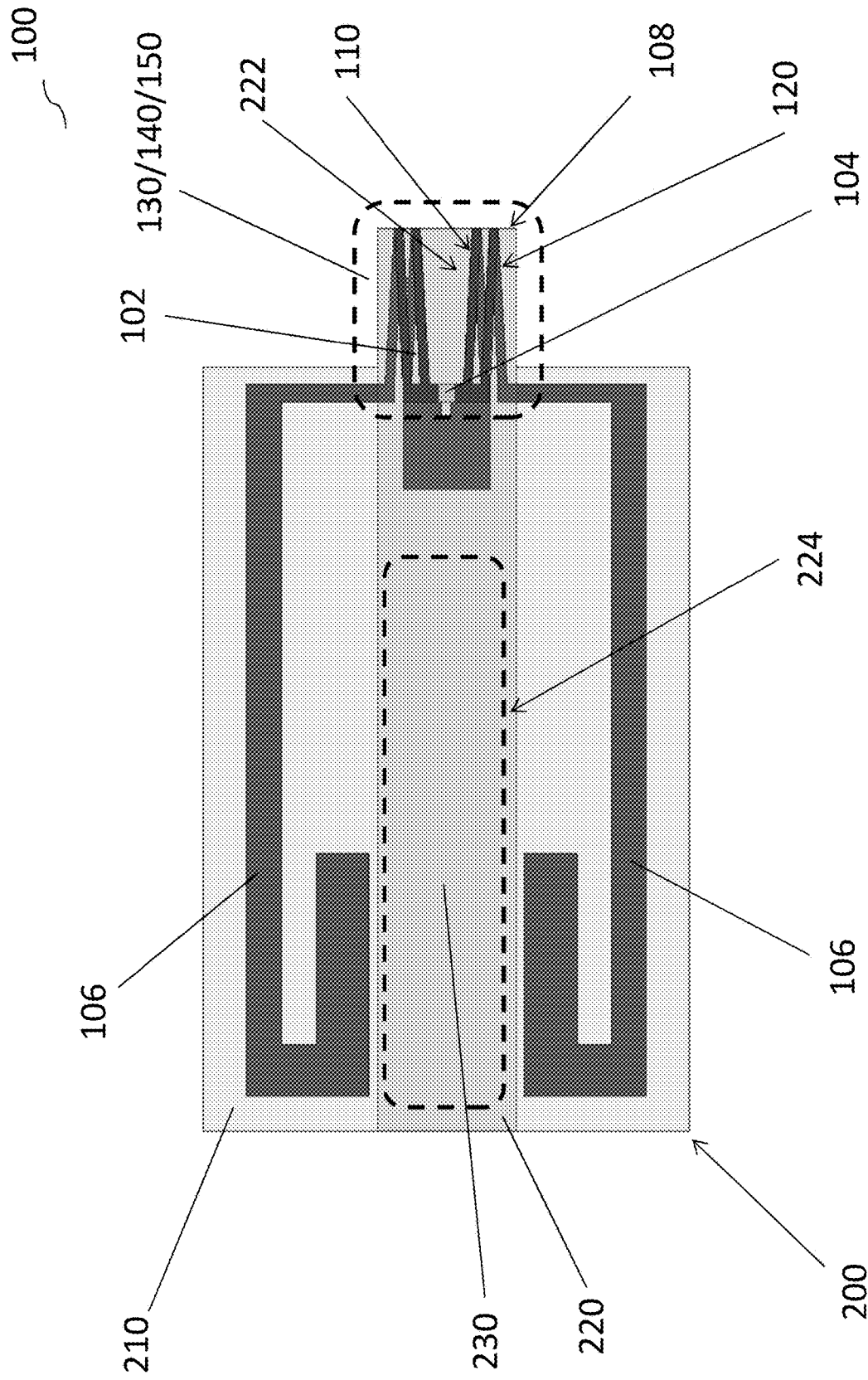
FIG. 1D is a top view of FIG. 1C in accordance with one embodiment of the present invention.

With reference to FIGS. 1C to 1D, the radio frequency communication device 100 may be further manipulated to form a more compact radio frequency communication device 100, by overlapping the first portion 130 and second portion 140. For example, the first portion 130 is folded over its opposing second portion 140 such that the first portion 130 overlaps with the second portion 140, thereby forming a frangible loop 150. The radio frequency communication device 100 is readable by a reader (not shown) at an operating read range at order of cm to 10-of-cm.

Preferably, the readability of the radio frequency communication device 100 is manipulated by the frangible loop 150. For instance, the read range of the radio frequency communication device 100 drops significantly if one of the first frangible path 110 or the second frangible path 120 is damaged. More preferably, the radio frequency communication device 100 is no longer readable by the reader at the operating read range or even at a more proximate read range than the operating read range if at least one of the first frangible path 110 and the second frangible path 120 is damaged.

In one alternative embodiment, the conductive loop 102, the integrated circuit arrangement 104 and the pair of opposing elongated conductors 106 may be disposed onto a substrate 200 to form a tag and preferably, a passive RFID tag. The substrate 200 is preferably formed by a fragile material. For instance, the substrate 200 may provide a main tag body 210 for receiving pair of opposing elongated conductors 106. In one example, the dimensions of the main tag body 210 may be approximately 44 mm (L) by 25 mm (W).

The substrate 200 may also provide an elongated strip 220 which is extended from the main tag body 210. The first and second paths 110 and 120 are received on one end 222 of the elongated strip 220, and an adhesive region 230 e.g. self-adhesive area with strong glue is provided on the other end 224 of the elongated strip 220, which is further away from the main tag body 210. Advantageously, the adhesive region 230 may be adhered to the main tag body 210 to secure the frangible loop 150. In one example, the dimensions of the frangible loop 150 formed may be approximately 8 mm (L) by 7 mm (W).

Preferably, the width of the elongated strip 220 should be much smaller than that of the main tag body 210, such that the elongated strip 220 may be adhered to the main tag body 210 through any small holes or ring structures. Advantageously, the conductive loop 102 and the opposing elongated conductor 106 are thin in design, such that the conductive loop 102 would not overlap with the opposing elongated conductors 106. This ensures that the readability of the pair of opposing elongated conductors 106 unaffected when the elongated strip 220 is adhered to the main tag body 210.

Figure 2:
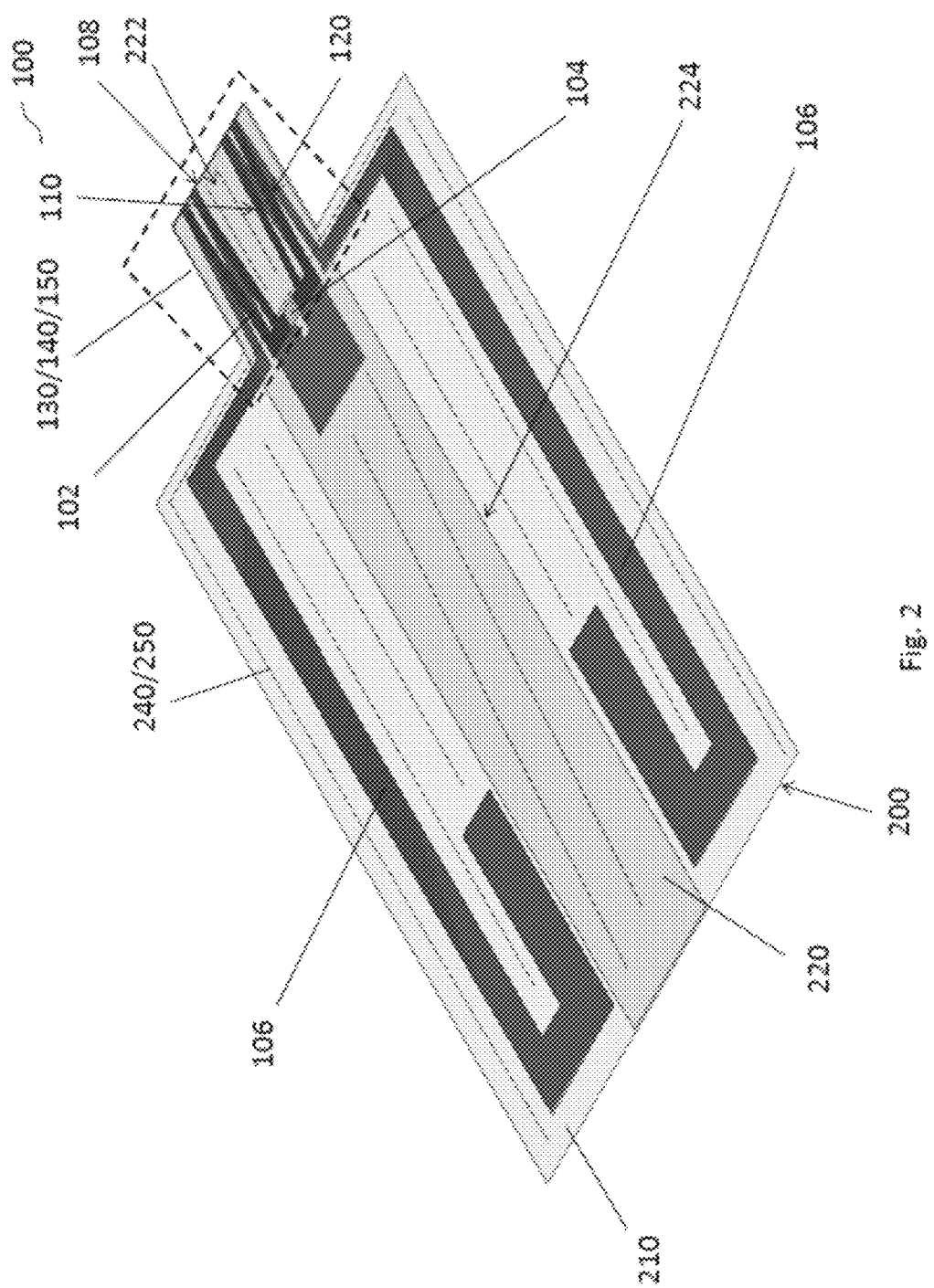
FIG. 2 shows a schematic view of the tag in accordance with another embodiment of the present invention.

With reference to FIG. 2, the substrate 200 may be further provided a perforated line 240 or a perforated structure 250 comprising a plurality of perforated lines 240, such that the frangible loop 150 is further damage-prone. For example, even if the substrate 200 is under a minimal shear stress, such magnitude is sufficient to tear off the substrate 200 into strips along the perforated line 240 or the perforated structure 250. Advantageously, this enhances the sensitivity of the radio frequency communication device 100 to tampering, and provides an extra level of temper-evidence appearance e.g. a noticeable, abnormal, or broken-tag appearance if tempered.

In yet another embodiment, the radio frequency communication device 100 may be extended to logistic applications. For instance, each of the radio frequency communication device 100 carries a unique EPC i.e. unique ID for identification. The radio frequency communication device 100 may communicated with the back-end server e.g. through a reader and send the information stored in the radio frequency communication device 100 immediately once the baggage 500 is being collected by courier service. Any tampering or attempted tampering of the unattended baggage 500 in the interim of the courier service may be detected by the radio frequency communication device 100, and provide a notification to the back-end server.

Figure 3:
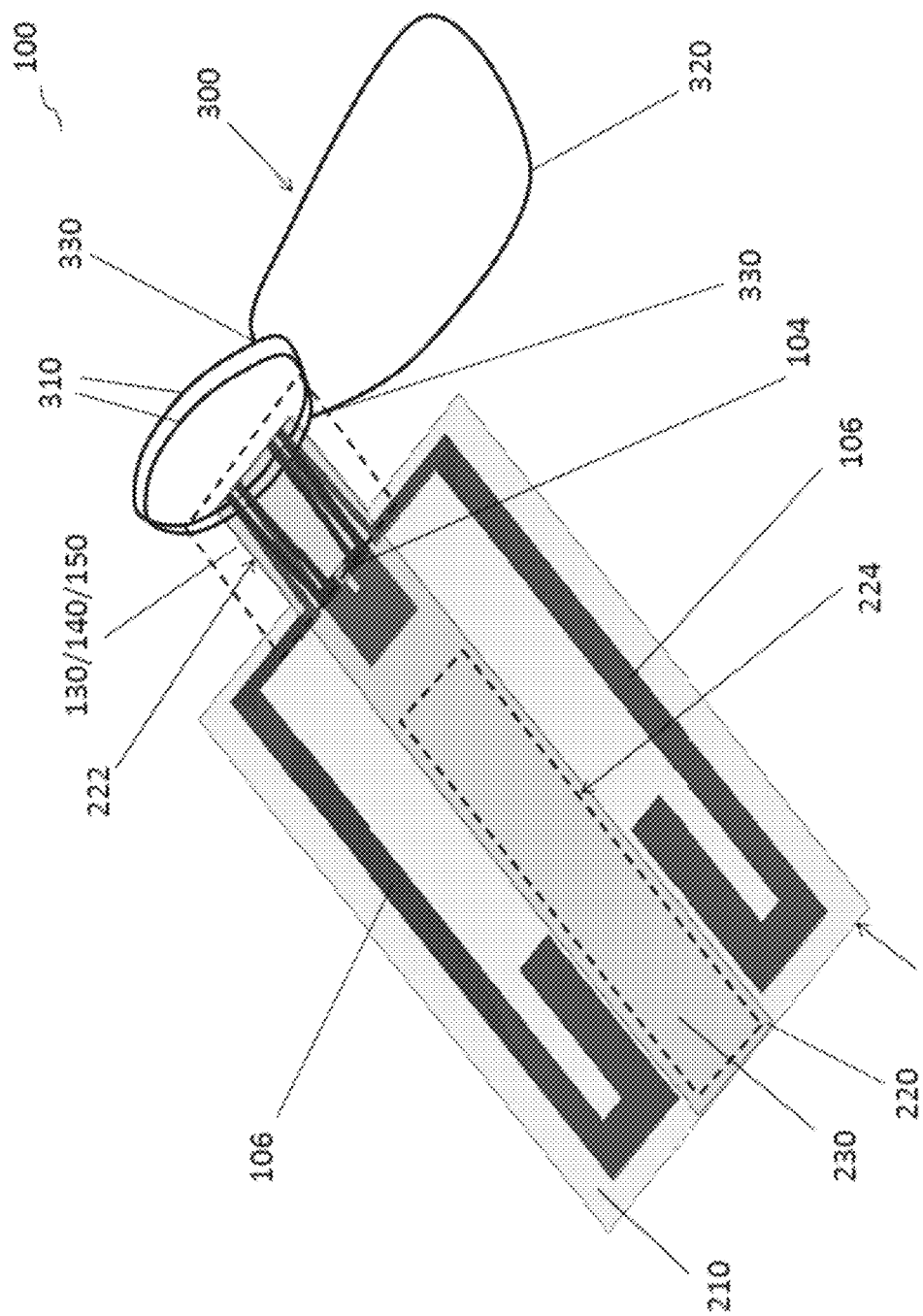
FIG. 3 shows a schematic view of the tag in accordance with yet another embodiment of the present invention.

With reference to FIG. 3, the radio frequency communication device 100 may function together with a baggage fastening means 300. In one embodiment, the baggage fastening means 300 may include a pair of ring structures 310, which is formed by rigid material such as metallic material or plastic, and a tensioned wire 320 e.g. metallic wire, adhesive tape, or tamper evident tape. Each end of the tensioned wire 320 is connected with a ring structure 310 preferably through a metallic joint 330. The baggage 500 may be wrapped around tightly by the tensioned wire 320. Advantageously, a desirable tension may be exerted on the tensioned wire 320 during the wrapping process. If the tensioned wire 320 has been cut during the tampering, such damage is permanent and the damaged tensioned wire 320 is unlikely to be reconnected.

Figure 4B:
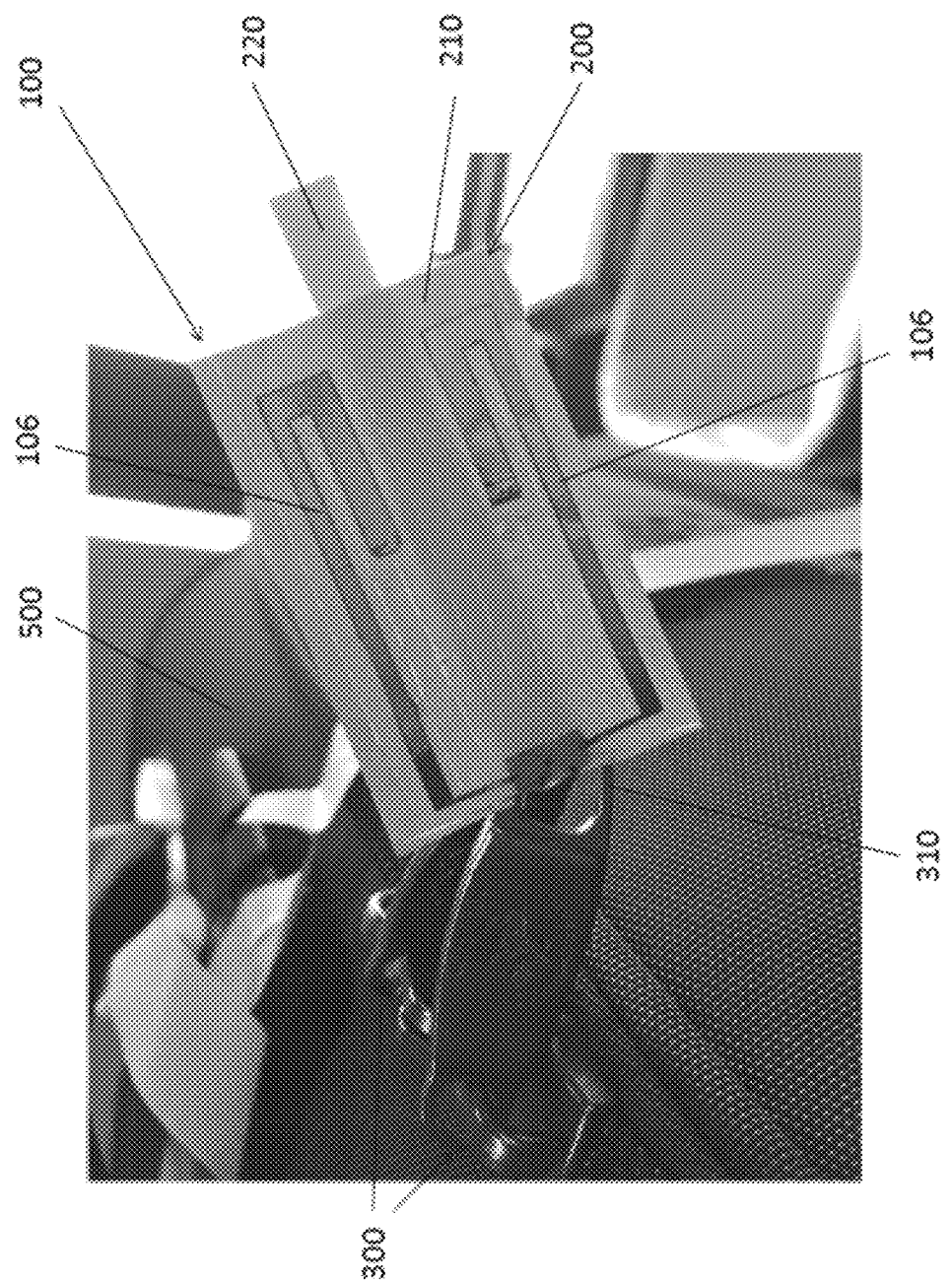
FIG. 4B shows a bottom view of the tag attached to an airport baggage handling label in accordance with one embodiment of the present invention.

With reference to FIGS. 4A to 4B, the radio frequency communication device 100 may alternatively function with the baggage fastening means 300 of the baggage e.g. zipper and a pair of ring structures 310 directly. The pair of ring structures 310 may be the pair of zipper pulls 310, which forms an integral part of the baggage fastening means 300.

Upon completing the baggage pack up and ready for check in at the airport, the baggage 500 may be fastened with the baggage fastening means 300. The user or the courier staff may put the first portion 130 of the frangible paths 110 and 120 through the ring structures 310 of the baggage fastening means 300, such that the first portion 130 overlaps with the opposing second portion 140 to form a frangible loop 150, and in turn attach the frangible loop 150 to the baggage fastening means 300 through the ring structures 310. The first frangible path 110 and the second frangible path 120 surround at least part of the adjacent ring structures 310. Advantageously, the adhesive region 230 may be adhered to the main tag body 210 to secure the frangible loop 150 firmly.

Figure 4C:
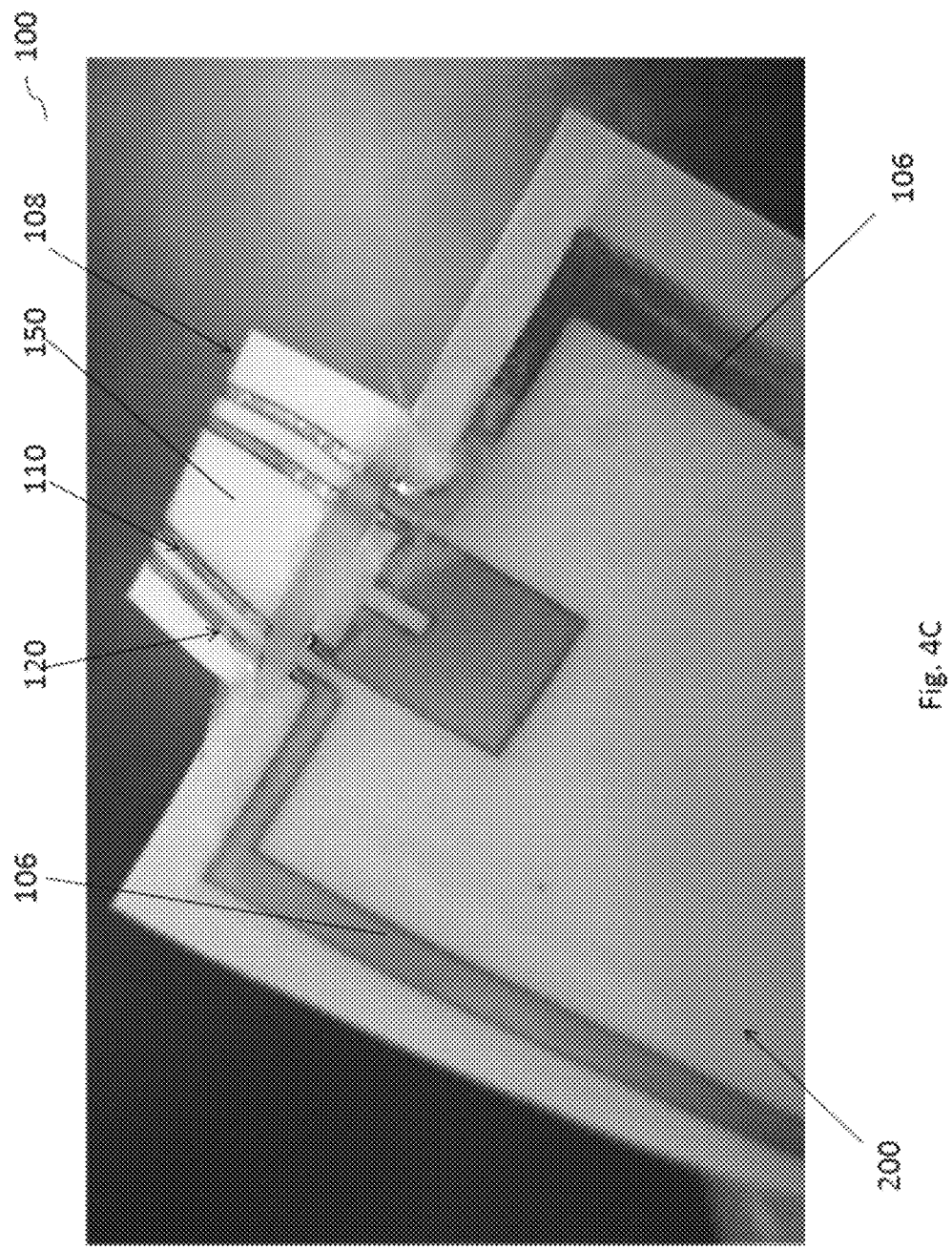
FIG. 4C shows a top view of the broken metallic traces in accordance with one embodiment of the present invention.

Advantageously, should the baggage fastening means 300 is being unfastened or the frangible loop 150 been physically damaged as shown in FIG. 4C, the damaged frangible loop 150 may provide an indication that the baggage 500 has been tampered. In one embodiment, the radio frequency communication device 100 may be no longer readable by the reader at the operating read range or even at a more proximate read range than the operating read range. The malfunctioning of the radio frequency communication device 100 indicates that the baggage 500 has been tampered. As such, any attempts to tamper with or open the protected package is plainly evidential and noticeable.

Advantageously, the radio frequency communication device 100 is readable by a reader at an operating read range at order of cm to 10-of-cm. In one embodiment, the tag may be attached to the baggage 500 without necessarily affixed directly to the surface of the baggage 500. For example, the tag may be further safeguarded with a protective coating, such that the frangible loop 150 would not be damaged unintentionally i.e. during logistic transportation.

Advantageously, the present invention may be applied in applications for safeguarding goods during transit where they may be unattended at the premise, e.g. hotel lobby, transacted between multiples parties e.g. delivery from different transit centres, where the baggage is expected to be handled by multiple operators, or unattended before arriving any official check-in locations.

Advantageously, the present invention may be further extended to all manner of cargo and potentially to provide assurance that cargo inspected at a checkpoint and secured with the tag without the need for further checking at a subsequent checkpoint should evidence of tampering be absent. The transit time of cargo may be significantly reduced. Ultimately, this may expedite the logistic arrangement and provide a more reliable courier service.

Advantageously, the present invention may also extend the check-in premises to locations outside airport and in-town check-in services, such as residential area or workplace area proximate to the baggage owners. This may provide a value added service to the flight passengers or cabin crew.

It will be appreciated by persons skilled in the art that although the embodiments comprising the radio frequency communication device 100 are applied to baggage, these embodiments may be applied in any other applications such as security systems, mail services with minor modifications and without departing from the concept of the present invention.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A radio frequency communication device comprising:
a conductive loop being electrically connected to an integrated circuit arrangement; and
a pair of opposing conductors extending away from the conductive loop and the integrated circuit arrangement;
wherein at least a portion of the pair of opposing conductors is frangible, the connection between the conductive loop and the integrated circuit arrangement is frangible, the conductive loop is electrically connected to the integrated circuit arrangement through a first frangible path, the pair of opposing conductors is extended away from the conductive loop and the integrated circuit arrangement through a second frangible path, the first frangible path is adjacent to the second frangible path, and a first portion of at least one of the first frangible path and the second frangible path is folded over its opposing second portion such that the first portion overlaps with the second portion.

2. A radio frequency communication device in accordance with claim 1, wherein the first portion of the frangible paths overlaps with the second portion of the frangible paths to form a frangible loop.

3. A radio frequency communication device in accordance with claim 2, wherein the conductive loop and the pair of opposing conductors are disposed onto a substrate to form a tag.

4. A radio frequency communication device in accordance with claim 3, wherein one end of the substrate is adhered to the main tag body to secure the frangible loop.

5. A radio frequency communication device in accordance with claim 4, wherein the substrate is formed by a fragile material.

6. A radio frequency communication device in accordance with claim 5, wherein the substrate is provided at least a perforated line or a perforated structure such that the frangible loop is further damage-prone.

7. A radio frequency communication device in accordance with claim 4, wherein the frangible loop is attached to a baggage fastening means through a ring structure.

8. A radio frequency communication device in accordance with claim 7, wherein the ring structure is an integral part of the baggage fastening means.

9. A radio frequency communication device in accordance with claim 7, wherein the ring structure is formed by rigid material selected from metallic material or plastic.

10. A radio frequency communication device in accordance with claim 7, wherein the baggage fastening means is selected from a zipper, metallic wire, tensioned wire, adhesive tape, and tamper evident tape.

11. A radio frequency communication device in accordance with claim 7, wherein the ring structure includes zipper pull.

12. A radio frequency communication device in accordance with claim 7, wherein the radio frequency communication device is no longer readable by the reader at the operating read range or even at a more proximate read range than the operating read range if the baggage has been tampered.

13. A radio frequency communication device comprising:
   a conductive loop being electrically connected to an integrated circuit arrangement; and
   a pair of opposing conductors extending away from the conductive loop and the integrated circuit arrangement;
   wherein at least a portion of the pair of opposing conductors is frangible, the connection between the conductive loop and the integrated circuit arrangement is frangible, the conductive loop is electrically connected to the integrated circuit arrangement through a first frangible path, the pair of opposing conductors is extended away from the conductive loop and the integrated circuit arrangement through a second frangible path, and the read range of the radio frequency communication device drops significantly when at least one of the first frangible path and the second frangible path is damaged.

14. A radio frequency communication device in accordance with claim 13, wherein the radio frequency communication device is readable by a reader at an operating read range at order of cm to 10-of-cm.

15. A radio frequency communication device in accordance with claim 13, wherein the radio frequency communication device is no longer readable by the reader at the operating read range or even at a more proximate read range than the operating read range when at least one of the first frangible path and the second frangible path is damaged.

16. A method for using a radio frequency communication device comprising:
   a conductive loop being electrically connected to an integrated circuit arrangement; and
   a pair of opposing conductors extending away from the conductive loop and the integrated circuit arrangement;
   wherein at least a portion of the pair of opposing conductors is frangible, the method comprising the steps of:
   fastening a baggage with the baggage fastening means;
   putting the first portion of the frangible paths through the ring structure of the baggage fastening means such that the first portion overlaps with the second portion of the frangible paths to form a frangible loop.

17. A method for using a radio frequency communication device in accordance with claim 16, further comprising the step of adhering the first portion of the frangible paths to the second portion of the frangible paths to secure the frangible loop.

* * * * *